United States Patent Office
3,440,242
Patented Apr. 22, 1969

3,440,242
AROMATIC POLYALKYLENAMIDES
George H. Smith, Maplewood, Minn., assignor to Minnesota Mining and Manufacturing Company, St. Paul, Minn., a corporation of Delaware
No Drawing. Original application Aug. 7, 1959, Ser. No. 832,152, now Patent No. 3,115,474, dated Dec. 24, 1963. Divided and this application Sept. 12, 1963, Ser. No. 308,362
Int. Cl. C07d 23/06; C08g 20
U.S. Cl. 260—239  5 Claims This invention relates to new compounds and the method of making same. In one aspect, this invention relates to stable and pure polyalkylenamides and their derivatives. In still another aspect, this invention relates to meta-substituted aromatic polyalkylenamides and homopolymers and copolymers thereof. This application is a continuation-in-part of my prior and copending applications, Ser. No. 676,400, filed Aug. 5, 1957, and now abandoned and Ser. No. 645,029, filed Mar. 11, 1957, and now abandoned, and is a division of Ser. No. 832,152, filed Aug. 7, 1959 now U.S. Patent 3,115,474.

A few polyalkylenamides have been disclosed in the art by their empirical formula but because of their instability as a result of their impure state no physical properties or no utility was disclosed for such compounds. As produced, these polyalkylenamides are in admixture with byproducts and impurities; and as a result, these polyalkylenamides react spontaneously with the byproducts and impurities or are isomerized to produce mixtures of unidentifiable compounds lacking technological interest. In general, therefore, polyalkylenamides have been considered laboratory or technical curiosities rather than useful compounds. Purification of such compounds as produced has apparently been impossible because of their instability. In their impure state, they decompose upon melting or distillation and apparently could not be solvent extracted from their impurities because their impurities had similar solubility characteristics.

The object of this invention is to produce for the first time substantially stable and substantially pure polyalkylenamides.

Another object of this invention is to produce new and stable compositions and mixtures.

Still another object of this invention is to produce new derivatives and polymers of polyalkylenamides.

Another object of this invention is to provide novel and useful organic solutions of polyalkylenamides providing a stable form of the polyamides.

It is still another object of the present invention to provide relatively stable, pure, reactive monomers capable of being controllably polymerized to produce useful homo- and copolymers.

It is a further object of the present invention to provide high polymers or resins in transparent and amorphous form possessing excellent physical and electrical properties.

It is also an object of the present invention to provide suitably pure and stable N,N'-bis-1,2-alkylenisophthalamides which can be stored over extended periods of time under normal storage conditions without undergoing conversion to other forms or decomposition, and which may be controllably polymerized when desired.

Similarly, another object of the present invention is to provide suitably pure and stable N,N',N''-tris-alkylenetrimesamides.

Another object of this invention is to produce aromatic polyalkylenamides in liquid form.

Yet another object of this invention is to produce alkyl polyethylenamides.

Still another object is to provide a new process for producing polyalkylenamides.

Various other objects and advantages of this invention will become apparent to those skilled in the art from the accompanying description and disclosure.

The new polyalkylenamides of this invention which are in substantially pure form and stable are the meta-substituted aromatic polyalkylenamides (from two to three alkylenamide groups, two of which are in the meta-position on the aromatic nucleus), including either a benzene or a naphthalene nucleus. The general formula for the meta-substituted benzene polyalklyenamides of this invention may be illustrated as follows:

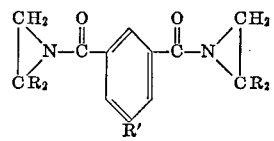

where R is hydrogen or an alykyl group containing not more than eight carbon atoms, such as methyl, ethyl, propyl, n-butyl and n-octyl group or radical; and R' is hydrogen or halogen, such as chlorine, fluorine or bromine, or an alkyl group similar in definition to R or 1,2-alkylene carboxamido group

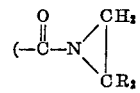

in which R is as defined above), or other monofunctional group not containing an active hydrogen, such as a cyano group. The members representing the R's in the above formula may be the same, or different from each other. Preferably, one R on each imine ring is hydrogen and the other R on each imine ring is hydrogen or an alkyl group having not more than four carbon atoms.

It is necessary that the aromatic nucleus be meta-substituted in relation to the 1,2-alkylene carboxamido groups

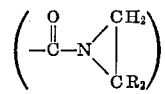

in order to obtain the most useful product of unexpected characteristics. For example, both homopolymers and copolymers of the meta-substituted aromatic polyalkylenamides of this invention are transparent and amorphous, apparently as the result of upsetting the symmetry of the molecule by the meta-substitution. This phenomenon is observed on both the bis-amides and tris-amides (where R' is 1,2-alkylene carboxamido group) of this invention as defined above. In contrast, N,N'-bis-ethylene terephthalamide polymerizes to an opaque crystalline material.

The presence of an alkyl group (R) on the ethylenamido group of the aromatic polyalkylenamide also reduces the symmetry of the molecule and reduces the melting point; and, in fact, many of these alkyl polyethylenamide products (with alkyl substitution) are normally liquid in form. For example, the N,N'-bis-ethyleneisophthalamide is a solid having a melting point of about 80° C.; whereas, the N,N'-bis-1,2-pyropylenisophthalamide (where R is an ethyl group) is a normally liquid. Also, when the aromatic nucleus is a naphthalene nucleus, the presence of the alkyl group on the ethylenamido group tends to offset the effect of the nucleus and maintains the melting point at a lower value than would be expected.

The most classical methods for producing the aromatic polyalkylenamides would be by the reaction of a polycarboxylic aromatic acid chloride with an alkylene imine in the presence of a hydrogen chloride acceptor under anhydrous conditions or in an aqueous reaction medium.

Although such methods may result in fair conversion, the product is at best an impure, unstable mixture of the polyalkylenamide and by-products, such as the acceptor chloride, beta-chloropolyethylamide and beta-hydroxypolyethylamide, which mixture upon standing a relatively short period of hours is converted to isomers and addition products containing negligible, if any, polyalkylenamide. The organic by-products are the result of opening of the imine ring by the hydrogen chloride and hydrolysis by water. In addition, to contaminating the product, these by-products cause further degradation of the desired aromatic polyalkylenamide. On moderate heating the mixture is spontaneously and sometimes violently converted to other materials most of which are unidentifiable.

It has been found in accordance with this invention that substantially pure and stable aromatic polyalkylenamides can be produced directly if a water-immiscible organic solvent for the polyalkylenamide is present in addition to an aqueous phase. The hydrogen chloride released from the reaction is confined to the aqueous phase and the product in the organic phase is effectively isolated from the hydrogen chloride and from the basic aqueous solution to prevent hydrolysis. The polyalkylenamide product may be recovered, if desired, from the organic phase by distillation. The organic phase as well as the recovered product contains less than one weight percent active chloride impurity, usually less than 0.5 weight percent chloride, calculated as chlorine. As produced, the azirane or imine ring content of the product is at least 95, usually 98 or better, percent of theoretical. In almost any preparation, however, there will be a small amount of halide impurity present, generally not less than about 0.1 weight percent. It has been found that the product to be stable and capable of controlled reactions, such as polymerizations and cross-linking reactions, must have at least 85, preferably 90, percent of the theoretical azirane ring content. A reaction product as produced containing more than about one weight percent halide (calculated as the halogen) correspondingly contains less than 85 percent of the theoretical amount of the azirane ring corresponding to the polyalkylenamide produced. Such a product is unstable and rapidly and progressively decreases in ring content on aging of not more than a few days at most until a point of lower ring content is reached where the rate of degradation of the product markedly increases. Products containing two to six percent halogen contain less than 70 percent theoretical ring content as produced and are rapidly degraded on aging. Such impure products cannot be heated without conversion and degradation of all of the polyalkylenamide to other products nor can such products undergo controlled reactions with other reactants.

The above phenomena observed on impure aromatic polyalkenamides is not clearly understood nor are the resulting products of the conversion known with certainty, but it is believed the hydrogen chloride formed in the reaction for making the product reacts with an azirane or imine ring of the polyalkylenamide to produce beta-chloroalkylpolyamide which itself acts as an ionic-type promoter and chain terminator to cause production of addition and degradation products with the remaining polyalkylenamide. The concentration of the beta-chloroalkylpolyamide, such as beta-chloroethylpolyamide progressively increases until it reaches a certain concentration at which the conversion of the remaining polyalkylenamide becomes autocatalytic under the conditions of storage. Heating the products, of course, would cause rapid degradation and decomposition to occur at a much lower concentration of beta-chloroethylpolyamide.

The pure and isolated products of this invention as above defined and described are stable in isolated form from three to six weeks or longer under ambient temperature conditions while the pure products kept under refrigeration of 5 to 10° C. are stable from about four months to about one year. In organic solutions, the pure polyalkylenamides of this invention are stable substantially indefinitely. Incidentally, the decomposition or conversion of impure products cannot be arrested materially by the above methods. The pure and stable aromatic polyalkylenamides of this invention can be heated to a temperature of from 70 to 80° C. or higher, depending on the particular polyalkylenamide, without substantially any degradation, decomposition or addition product formation taking place. The product will, however, sometimes polymerize slowly at such temperatures, again depending on the particular product.

The compounds of this invention are characterized by at least two highly reactive ethylenimine rings for each molecule which open when the compounds are subjected to heat or the action of an acidic or basic promoter to produce a polymeric resinous material. These polymeric materials have uses as plastics in the form of gaskets, O-rings, tubing, protective films, etc., resinous castings, potting compositions, as coating for fabric, paper, plastics and various surfaces, and as adhesives. Homopolymers of this invention vary from flexible to extremely hard and scratch-resistant polymers having three-dimensional structure. They undergo a minimum of shrinkage during polymerization. The adhesion to glass and ceramics of these homopolymers is particularly outstanding. In addition to producing homopolymers of the compounds according to this invention, copolymers can be produced by copolymerizing the compounds with other compounds having reactive functional groups containing active hydrogens by virtue of its two highly reactive alkylenimine groups. The active hydrogen of the coreactant must be capable of transferring to the nitrogen atom of the imine ring which opens up thus resulting in the conversion of the polyalkylenamide into a bi-functional reactant in the case of the bis-amide, or a tri-functional reactant in the case of the tris-amide. The polyalkylenamides of this invention are also capable of acting as cross-linking agents for linear thermoplastic and elastomeric polymers to produce a three-dimensional polymer network structure thereby providing solid materials having excellent physical and chemical properties, where such polymers contain active hydrogens.

In general, polymerized meta-substituted aromatic polyalkylenamides of this invention are all solid high polymers having an average molecular weight above about 25,000. The homopolymers are of very high molecular weight, generally above 100,000 and as much as 500,000 and higher. The copolymers vary considerably due to the amount of polyalkylenamide used and the type of copolymerization. Linear-type copolymers are sometimes of fairly low molecular weight, such as about 30,000 to about 150,000, while cross-linking type of copolymerization is considerably higher, usually 150,000 and higher molecular weight. It is characteristic of the pure polyalkylenamides of this invention that they completely polymerize by opening up of the imine ring by attachment of active hydrogen to the nitrogen atom of the ring as illustrated:

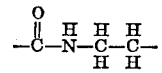

The preferred and most useful aromatic polyalkylenamides of this invention include the class of N,N'-bis-1,2-alkylenisophthalamides and the class of N,N',N''-tris-alkylenetrimesamides varying in form from normally solids to normally liquids. Sub-classes within each of these classes, which sub-classes have distinct and unexpected properties, are the bis-1-alkyl-1,2-ethylenisophthalamides, and the tris-1-alkyl-1,2-ethylenetrimesamides. The preferred isophthalamides have the general formula illustrated as such:

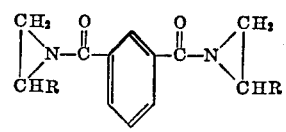

and the preferred trimesamides have the general formula illustrated as such:

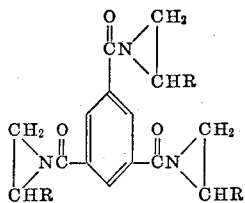

in which R for both formulae is the same as defined previously.

Among the N,N'-bis-1,2-alkylenisophthalamides in accordance with this invention are N,N'-bis-1,2-ethylenisophthalamide; N,N'-bis-1,2-butylenisophthalamide; N,N'-bis-1,1-dimethylethylenisophthalamide; N,N'-bis-1,2-propylenisophthalamide; N,N' - bis - 1,2 - pentylenisophthalamide; and N,N'-bis-1,2-octylenisophthalamide, etc. Mixtures of these compounds may be produced by employing two different 1,2-alkylenimines in producing the polyamides of the invention in accordance with the process of the invention, thus producing N-1,2-butylene, N'-ethylenisophthalamide, for example. Illustrative of the N,N',N''-tris-alkylenetrimesamides according to the present invention are N,N',N''-tris-ethylenetrimesamide; N,N',N''-tris-2-methylethylenetrimesamide; N,N',N''-tris-2-ethylethylenetrimesamide; N,N',N''-tris-2-propylethylenetrimesamide; N,N',N'' - tris - 2 - butylethylenetrimesamide; N,N',N'' - tris - 2 - isopropylethylenetrimesamide; N,N',N''-tris-2,2-dimethylethylenetrimesamide; N,N',N''-tris-2-methyl-2-ethylethylenetrimesamide and N,N',N''-tris-2,2-dipropylethylenetrimesamide, etc. Mixtures of these compounds may, of course, be produced by employing a mixture of different 1,2-alkylenimines in producing them.

Homopolymers and copolymers of the above compounds may be produced by heating in the absence of a catalyst or promoter the monomer or mixtures thereof to a temperature of up to about 150° C., usually above 70° C. or 80° C., depending upon time required for polymerization, or polymerization may be conducted at lower temperatures such as at room temperature by employing from about 0.1 to about 3 weight percent of an acidic or basic promoter or initiator, such as a sulfonic acid, p-toluenesulfonic acid, or an amine, such as ethylenediamine, or other such promoter as hereinafter described.

The polyalkylenamides of this invention are derivatives of the meta-substituted aromatic acids, such as isophthalic acid which is otherwise known as meta-phthalic acid. It has been discovered that the polyalkylenamides of the meta-substituted aromatic acids, in particular isophthalic acid, are surprisingly superior to the polyalkylenamides of the para-substituted acids, in particular terephthalic acid. For example, the isophthalamides of this invention, when polymerized, form clear, transparent, non-crystalline, thermosetting homopolymers, having high heat-distortion temperatures, which do not shrink during polymerizing or thereafter and which have excellent adhesion to a variety of structural materials. These properties are significantly superior to those of N,N'-bis-ethylene terephthalamides. The polyethylenamide of terephthalic acid ordinarily polymerizes uncontrollably and exothermally at or near its melting point to produce a black tarry mixture of homopolymer which is crystalline and opaque. On the other hand, the isophthalic amide polymerizes more slowly and controllably at, or somewhat above, its much lower melting point. The N,N'-bis-ethylene terephthalamide apparently melts at 142–144° C. while the N,N'-bis-ethylenisophthalamide melts at a much lower temperature of 76–78° C.

The undesirable characteristics of the terephthalic polyamide prohibit its use in many of the fields of utility where the polymers of the meta-substituted aromatic polyamides of this invention are suitable. An example of such utility is in encapsulating resins for electronic circuits where it is often necessary to inspect the encapsulated components. Additionally, transparency of the polymeric resin is often needed for other reasons, such as, for example, in optical adhesives where transparency both enhances appearance and permits necessary transmission of light. The ease of bulk polymerizing a number of the isophthalamide monomers in accordance with this invention, such as the monomer of 1,2-butylenimine, is also important in encapsulation applications where it is desired to obtain syrup which will pour at relatively low temperatures and yet polymerize in place without appreciable bubbling or shrinking.

These advantageous properties of the beta-substituted aromatic polyalkylenamides and their polymers, produced in accordance with this invention, enable the synthetic resin art to provide superior coatings, sheets or films, castings, adhesives, etc.

In accordance with the process for producing the polyamides of this invention in a stable and pure form, an alkylenimine or a mixture of two or more alkylenimines desirably containing not more than ten carbon atoms per imine molecule, such as ethylenimine, 1,2-propylenimine, 1,2-butylenimine, 1,2-pentylenimine, 1,2-hexylenimine, 1,1-dimethylethylenimine, etc., is reacted with an acid polyhalide, such as the chloride or bromide, derivative of a meta-substituted aromatic polycarboxylic acid, such as isophthaloyl dichloride, chloroisophthaloyl dichloride, 5-methylisophthaloyl dichloride, or trimesoyl trichloride, to produce the desired substantially pure aromatic polyalkylenamide of this invention, and hydrogen halide as a by-product. The alkylenimine and the acid polyhalide are employed in an approximately stoichiometric ratio. Advantageously, an excess of alkylenimine, such as about 5 percent by weight, over and above this ratio may be employed, although an excess of about 15 to 25 weight percent may be employed.

Desirably, the alkylenimine is dissolved in an aqueous solution which also contains an alkali-metal carbonate, such as sodium, potassium or lithium carbonate, which acts as an acid acceptor to neutralize the hydrogen halide formed during the reaction of the process. When a higher 1,2-alkylenimine than ethylenimine, i.e., one containing more than two carbon atoms, is employed, an alkali-metal bicarbonate, such as sodium, potassium, or lithium bicarbonate, may be used as the acid acceptor instead of a carbonate. This aqueous solution is intimately mixed with the acid polyhalide, such as isopthaloyl dichloride, dissolved in a substantially water-immiscible organic solvent which is chemically inert to both the reactants and the reaction products (one not having an active hydrogen). The reaction appears to take place at the interface between the two immiscible liquids, the product of reaction being dissolved in the organic solvent phase, thereby being isolated from the hydrogen halide in the aqueous phase. The polyalkylenamide reaction product is then recovered in a relatively pure, stable state in high yield from the organic solvent, in which it collects as the reaction proceeds, by evaporating the solvent. This process of producing the compounds has been found to be the only one which effectively minimizes attack on and decomposition of the polyalkylenamide product by hydrogen halide formed during the course of the reaction.

It has been discovered that in producing aromatic N,N'-bis-1,2-alkylenamides with ethylenimine according to the invention, pH control of the reaction mixture is more critical than where alkylenimines containing more than two carbon atoms are employed. Thus, in such cases it is important to employ an alkali-metal carbonate as the acid acceptor in an amount sufficient to neutralize all of the hydrogen halide formed during the reaction of the process and yet maintain the pH of the reaction mixture at about 8.5 or above. With alkylenimines containing more than two carbon atoms, on the other hand, an alkali-metal bicarbonate may be employed instead of an alkali-metal carbonate as the acid acceptor, so long as sufficient bicarbonate is present to neutralize all of the hydrogen halide formed. This phenomenon is believed to be the consequence of the greater reactivity of polyethylenamide products when compared to those polyalkylenamide products containing alkyl substituents.

The prevention of decomposition of the aromatic polyalkylenamides by the hydrogen halide formed during the process which this process provides is critical to the production of stable monomer product in useful amounts. These polyalkylenamides of this invention containing the C=O group, unlike those derived from sulfonic acid halides and alkylenimines, react, even at low temperatures, with hydrogen halide, particularly hydrogen chloride, to irreversibly open the terminal imine rings to form beta-haloalkylpolyamides, such as beta-chloroalkylpolyamides. These beta-haloalkylpolyamides are believed to act as powerful ionic-type catalysts and chain terminators for alkylenimines and polyalkylenamides, and this is probably the reason the presence of halogen in combined form in the polyalkylenamide product is detrimental to the product stability.

Protection of the polyalkylenamides from attack by the hydrogen halide is further complicated by the necessity of utilizing an alkali as an acid acceptor to take up or neutralize the hydrogen halide as it is formed, since an excess of certain alkalies, notably the strong alkali-metal hydroxides, such as sodium and potassium hydroxides, cause hydrolysis and consequent formation of beta-hydroxyalkylpolyamides unless the temperature of reaction is kept below about $-5°$ C., and react irreversibly even in dilute solutions with beta-haloalkylpolyamides with the formation of oxazoline derivatives.

The interrelated and detrimental side reactions of the alkalies and hydrogen halide on the products of the invention are effectively minimized or prevented by the process of the invention. The success of this process is believed to be dependent upon a combination of factors. Since, for illustration, the isophthaloyl dichloride which is dissolved in the organic phase is immiscible with the water phase, the amide product is believed to form only at the interfaces between the organic solvent and aqueous phases, and being water insoluble, passes immediately into the organic phase. Conversely, the hydrogen chloride formed during the course of the reaction, being very water soluble, remains in the aqueous phase where it combines with the alkali-metal carbonate or bicarbonate at a rate sufficient to prevent combined chlorine contamination of the product and consequently prevents cleavage or opening of the alkylenimine rings and also the formation of oxazoline derivatives. Regardless of the accuracy of this theory, the process produces stable aromatic polyalkylenamides in yields often exceeding 90 percent of theory and containing less than about 1 percent by weight of active halogen impurity and at most, negligible amounts of beta-hydroxyalkylpolyamides.

As noted hereinbefore, the presence of active chlorine in combined form in the N,N'-bis-alkylenisophthalamide product is detrimental to the stability of the product. In the course of practicing this invention it has been found that the presence of combined halogen or chlorine impurity or contaminant in amounts as low as 2 to 5 weight percent calculated as elemental chlorine causes degradation of the polyalkylenamides even at low temperatures. In fact, active chloride contamination of the product in amounts greater than about 1 weight percent calculated as elemental chlorine has been found to be detrimental to product stability. Consequently, it is preferred that chlorine contamination of the product be maintained at a value at or below about 1 weight percent. This is readily accomplished by the process of this invention without resorting to expensive and cumbersome purification procedures, even if such procedures were possible.

The ability to provide products in accordance with the invention which are relatively pure in the sense of being relatively free from combined chlorine impurity and other unwanted byproducts from the process of preparation is extremely important. This purity is reflected in excellent storage and pot life characteristics. Without it, it has not been possible to obtain a product which is at all useful since the polyalkylenamide may often react to form insoluble solid conversion products in the reaction vessel before it can be isolated. This can result in the formation of a rigid solid mass which must be mechanically chipped and removed from the vessel. Not only is this wasteful but it is hazardous since the unwanted reactions may take place in an uncontrollable manner and cause an additional explosion hazard in the presence of free ethylenimine, which is notoriously unstable. These difficulties are obviated with the present products and process for producing them.

Desirably, the process of producing the products is carried out at a temperature range from about $-5°$ to $+30°$ C., preferably between about 10 and about 20° C. Although lower temperatures may be employed, there is no advantage in doing so, since they require additional expensive refrigeration or other cooling equipment. At higher temperatures, reduction in yield of product by hydrolysis and oxazoline formation is sometimes encountered.

Although any of the alkali-metal carbonates and bicarbonates may be employed as acid acceptors in the process of the invention, sodium and potassium carbonates and bicarbonates are preferred.

Among the substantially water-insoluble inert organic solvents which may be employed at the temperature of reaction are the aromatic halogenated and oxygenated hydrocarbons, such as chloroform, methylchloroform, benzene, toluene, xylene, diethylether, trichloroethylene, etc. Chloroform, benzene and toluene are the preferred solvents.

The requirements for the organic solvents to be used as the organic phase of the reaction are that it must be immiscible with the aqueous phase and be capable of dissolving a reasonable amount of the reactant acid chloride, such as 15 to 30 weight percent or higher before saturation at the temperature of reaction. As previously stated, these solvents, particularly the preferred solvents, are excellent for storage of the products of this invention for extended periods of time. In case of storage, the solution should be as anhydrous as possible, such as by drying the product solution with a molecular sieve or with calcium sulfate. The solvents should preferably have low volatility to facilitate separation of the product therefrom by distillation or evaporation. In general, the selection of the proper solvent for the particular product to be produced is best accomplished by trial and error. The preferred solvent for the polyisophthalamide of this invention is benzene and the only presently known solvent for ethylenetrimesamide is chloroform.

The products of this invention can be dissolved in many solvents, such as the hydrocarbons, at elevated temperatures such as at, or near, the boiling point of the solvent. Such technique may be used for recrystallization purposes to remove substantially all traces of impurities from the product.

The products of this invention may be homopolymerized or copolymerized by merely heating them to a temperature of up to about 150° C. The rate of polymerization may be enhanced by employing an acidic or basic initiator or an active hydrogen containing compound. Either weak or strong acids and bases may be used. Among the acids are the heavy metal chlorides, such as zinc or lead chlorides, the mineral acids, such as hydrochloric, sulfuric or phosphoric acids, sulfonic acids, such as p-toluenesulfonic acid, and other acids, such as boron trifluoride molecular addition product with monoethylamine. Among the bases are the amines, such as ethylene diamine or monoethanolamine. Among the active hydrogen compounds are the hydrazides, such as isophthaloyl dihydrazide. Copolymers may be produced by heating the polyalkyleneamide in accordance with this invention with other reactive monomers, such as the epoxy monomers, amines, such as the primary monoamines and primary and secondary diamines and triamines, polycarboxylic acids, polymercaptans, polyalcohols, such as castor oils, sugars, glycols, and triols, phenols, and other monomers having a plurality of reactive functional groups. Examples of particularly useful comonomers are aniline, meta-xylylene diamine, piperizine, triethylene tetramine, tetraethylene glycol, emery dimerized and trimerized acids, hexamethylene dimercaptan, and hydroquinone.

The polyalkylenamides of this invention may be also copolymerized or cross-linked with other polymers or synthetic resins which contain active hydrogen or groups in reactive form, such as urea-formaldehyde polymers, phenolic resins, polysulfide polymers, polyamide polymers, epoxy resins, and polyester polymers containing free carboxyl groups or hydroxy groups. The alkyl polyalkylenamide above ethylene are less reactive than the ethylene polyamides; and, therefore, generally require somewhat more severe conditions for reaction and polymerization. In this respect, these higher-alkylene polyamides have a tendency to be more stable than the ethylene polyamides of this invention; and, therefore, easier to handle and store in general. Some of these alkyl polyalkylenamides, such as poly-1,1-dimethylethylenamide, are relatively inert and, therefore, may be used as lubricants and plasticizers.

In order to more clearly disclose the invention, the following examples illustrating the process, products and compositions in accordance with the invention will now be described. It should be understood, however, that this is done solely by way of illustration.

Example 1

To a 1000 ml. three-neck reaction flask equipped with a stirrer, a thermometer, a condenser and a dropping funnel were added 352 grams of a 5.5 percent by weight aqueous solution of ethylenimine containing 3.8 percent by weight of sodium hydroxide as an inhibitor. To this were added 28.1 grams of sodium bicarbonate (to convert the sodium hydroxide to sodium carbonate) and 10.6 grams of sodium carbonate. The mixture was stirred until all materials had dissolved. The solution was then cooled to 7° C. To the solution was then added 42 grams of isophthaloyl dichloride dissolved in 200 ml. of ethylene trichloride during which addition the mixture was cooled and stirred. During this addition the temperature was kept below 10° C. and the solution of isophthaloyl dichloride was fed into the reaction mixture at a rate of approximately 1 gram of isophthaloyl dichloride per minute. The reaction mixture was permitted to warm gradually until it reached room temperature (21° C.), and stirred at room temperature for an additional three hours. The ethylene trichloride layer was separated and dried over anhydrous calcium sulfate, the calcium sulfate removed by filtration, and the ethylene trichloride solvent removed by distillation under vacuum. The reaction product, N,N'-bis-ethylenisophthalamide, remained as a white crystalline product melting at 76–78° C. The yield was 42 grams (98% of theoretical). The chlorine impurity content was less than 1 weight percent and the imine or azirane ring content was above 95 weight percent.

Example 2

Into a 5-gallon glass-lined reaction kettle equipped with a thermometer, a condenser, and stirrer were added the following materials which were stirred until a clear solution resulted:

| | Pounds |
|---|---|
| Water | 20.5 |
| Ethylenimine | 1.32 |
| Potassium hydroxide (100% solids) (mixed with the ethylenimine to stabilize it) | 0.8 |
| Potassium bicarbonate (to convert potassium hydroxide to potassium carbonate) | 2.0 |
| Potassium carbonate | 1.07 |

A second solution of about 2.69 pounds of isophthaloyl dichloride dissolved in 19.3 pounds of ethylene trichloride was added to the solution over a 53 minute interval during which time the temperature of the mixture was maintained at from about 13 to 17° C. The mixture was then stirred for about 1¾ hours after the completion of the addition, the temperature being maintained in the same range. The ethylene trichloride fraction was separated, dried over anhydrous calcium sulfate, and the solvent evaporated to produce 2.86 pounds of N,N'-bis-ethylenisophthalamide as a residue for a yield of 93.9 percent. The reaction product was found to contain 0.8 weight percent chlorine impurity (part of which was inactive chlorine of the residual solvent), and 37.5 weight percent azirane ring content as compared to the calculated values of 0 weight percent and 38.9 weight percent, respectively. The azirane ring content corresponds to 96.5 percent of theoretical. The melting point of the product was about 77° C. and an index of refraction of 1.59 at 80° C.

A sample of the N,N'-bis-ethylenisophthalamide produced in accordance with this example, after recrystallization from boiling cyclohexane, was aged for six months at room temperature (21° C.) and was found to be substantially unchanged at the end of that time. This was established by redetermining the melting point of the sample, and the percent of azirane ring, both of which were substantially unchanged. This demonstrated that the material was stable, remaining as a substantially pure, unreacted monomer.

Example 3

To a 1-liter three-neck flask aquipped with a stirrer, thermometer, condenser and dropping funnel, there was charged about 200 ml. of water, 41.4 grams of potassium carbonate and 15.6 grams of 1,2-butylenimine and the mixture stirred until a solution was obtained. A second solution of 20.4 grams of isophthaloyl dichloride dissolved in 100 ml. of chloroform was added over a period of 30 minutes with strong agitation and the agitation continued for 4 hours after the addition was complete. During this time the pH of the mixture dropped from about 12.5 to about 9.7. The temperature was maintained at approximately 14–16° C. throughout the reaction period. The aqueous and organic layers were then separated and the organic layer dried over anhydrous sodium sulfate, the sodium sulfate removed by filtration, and the solvent evaporated to provide 24.8 grams of a water-white viscous liquid product which was identified as N,N'-bis-1,2-butylenisophthalamide, for yield of 89 percent of the theoretical. When the product was subjected to analysis, it was found to contain 0.6 weight percent chlorine impurity (about 0.2 weight percent was inactive chlorine of residual chloroform), and 49.7 weight percent of 2-ethylazirane radical as compared with the calculated values of 0 percent chlorine and 51.5 weight percent of 2-ethylazirane radical. The 2-ethylazirane ring content corresponded to 96.5 percent of the theoretical.

Example 4

To a 1000 ml. three-neck reaction vessel equipped with a stirrer, thermometer, condenser and dropping funnel were added 400 ml. of water, 55.2 grams (0.4 mol) of potassium carbonate, and 23.3 grams (0.4 mol) of 1,2-propylenimine. The resulting solution was stirred and cooled to 15° C. at which time a solution of 40.6 grams (0.2 mol) of isophthaloyl dichloride dissolved in 200 ml. of benzene was added dropwise with cooling and stirring over a period of 45 minutes. The temperature was maintained at 14–16° C. during the addition. The reaction mixture was then stirred for an additional six hours during which time the temperature of the mixture was permitted to reach room temperature. The benzene layer was separated and evaporated to give 47.7 grams of N,N'-bis-1,2-propylenisophthalamide, for yield of 98 percent. The product was a water-white liquid, which upon analysis was found to contain 10.9 weight percent nitrogen, 0.37 weight percent chlorine, and 44.9 weight percent 2-methylazirane radical. The calculated values were 11.5 weight percent, 0.0% and 46.0 weight percent, respectively. This corresponded to 97.5 percent theoretical 2-methylazirane content.

Example 5

A 1000 ml. three-necked flask was equipped with a stirrer, thermometer, condenser, and dropping funnel. To the flask was added 500 ml. of water, 82.8 grams (0.6 mol) $K_2CO_3$, and 23.4 grams (0.41 mol) of 1,2-propylenimine. The mixture was stirred and cooled to 10° C. and a solution of 47.5 grams (0.2 mol) of chloroisophthaloyl dichloride in 300 ml. of benzene was added dropwise with stirring and cooling in 60 minutes. The temperature was kept at 10–12° C. during the addition and then allowed to warm to room temperature while stirring an additional hour. The layer was separated, dried over molecular sieve, filtered, and evaporated to constant weight under vacuum, 55.5 grams of solid product, N,N'-bis-1,2-propylenechloroisophthalamide, were obtained, corresponding to 99 percent yield, and melting at 104–112° C.

*Analysis in percent by weight.*—Calculated: N ◁, 40.2; Cl, 12.75. Found : N ◁, 39.5; Cl, 12.90.

This corresponds to an azirane ring content of 97.5 percent of theoretical and active chlorine impurity content of 0.15 weight percent.

Example 6

A 1000 ml. three-necked flask was equipped with a stirrer, thermometer, condenser, and dropping funnel. To the flask was added 400 ml. of water, 82.8 grams (0.6 mol) $K_2CO_3$, and 17.6 grams (0.41 mol) of ethylenimine. The mixture was stirred and cooled to 10° C. and a solution of 47.5 grams (0.2 mol) of chloroisophthaloyl dichloride in 200 ml. of chloroform was added dropwise with stirring and cooling in 60 minutes. The temperature was kept at 10–12° C. during the addition and then allowed to warm to room temperature while stirring an additional hour. The layer was separated, dried over molecular sieve, filtered, and evaporated to constant weight under vacuum. 47.8 grams of white solid product, N,N' - bis - ethylenechloroisophthalamide, were obtained, corresponding to 95.5 percent yield, and melting at 101–104° C.

*Analysis in percent by weight.*—Calculated: N ◁ , 35.5. Found: N ◁, 33.3.

This corresponds to an azirane ring content of 94 percent of theoretical and chlorine impurity content was less than 0.5 weight percent, part of which was inactive chlorine of the solvent chloroform.

Example 7

To a reaction flask equipped with a stirrer, a thermometer, a condenser, and a dropping funnel was added 400 ml. of water, 82.8 grams (0.6 mol) of potassium carbonate and 7.3 grams (0.17 mol) of ethylenimine. The mixture was stirred until a solution was obtained and the solution was cooled to 12° C. A solution of 13.3 grams (0.05 mol) of trimesoyl chloride in 400 ml. of chloroform was added dropwise with cooling and vigorous stirring over a period of about 75 minutes. During this time the temperature of the mixture was maintained at 12–15° C. The reaction mixture was then allowed to warm to room temperature, while stirring, for an additional 1½ hours. The chloroform layer was separated and evaporated at room temperature under vacuum to give 9 grams of N,N',N" - tris - ethylenetrimesamide. This product was recrystallized from boiling ethyl acetate leaving a white crystalline solid melting at 181° C. The yield was 64 percent of theoretical. When subjected to analysis, the product was found to contain 14.3 weight percent nitrogen and about 43.1 weight percent azirane radical as compared with calculated values of 14.7 percent and 44.2 percent respectively. The azirane ring content was 97.5 percent of theoretical and the active chlorine impurity was about 0.3 weight percent.

The trimesoyl chloride starting material for the present examples is prepared in a single step from trimesic acid by reacting it with phosphorus pentachloride (using a molar ratio of acid to phosphorus pentachloride of about 1 to 3). After heating this mixture until solution occurs (of the order of 2 hours) the phosphorus oxychloride by-product is removed under vacuum and the residual crude acid chloride product distilled by using steam in the condenser. A high yield (92 percent or better) of the white crystalline trimesoyl chloride which boils at 118–119° C. at 0.1 mm. of mercury pressure is obtained.

Example 8

To a reaction flask equipped with a stirrer, a thermometer, a condenser, and a dropping funnel were added 200 ml. of water, 41.4 grams (0.3 mol) of potassium carbonate and 9.7 grams (0.17 mol) of 2-methylethylenimine. The mixture was stirred until a solution was obtained and the solution was cooled to 12° C. A solution of 13.3 grams (0.05 mol) of trimesoyl chloride in 200 ml. of benzene was added dropwise with cooling and vigorous stirring over a period of 50 minutes. During this time the temperature of the mixture was maintained at 12–15° C. The reaction mixture was then allowed to warm to room temperature, while stirring, for an additional 1½ hours. The benzene layer was separated and evaporated at room temperature under vacuum to give 16.2 grams of N,N',N" - tris - 2 - methylethylenetrimesamide. This product was recrystallized from boiling isopropanol leaving a white crystalline solid melting at 117–119° C. The yield is quantitative. When subjected to analysis, the product was found to contain 12.8 weight percent nitrogen, 49.8 weight percent 2-methyl azirane radical and 0.1 weight percent chlorine as compared with calculated values of 12.84 weight percent, 51.4 weight percent and 0.0 weight percent, respectively. The ring content corresponded to 97 percent of theoretical.

When the same procedure was followed in another run, except that 0.2 mol of potassium bicarbonate was used as the hydrogen acceptor, comparable results were obtained. The yield of N,N',N" - tris - 2 - methylethylenetrimesamide (N,N',N" - tris - 1,2 - propylenetrimesamide) is about 93 percent of theoretical.

Example 9

To a reaction flask equipped with a stirrer, a thermometer, a condenser, and a dropping funnel were added 300 ml. of water, 41.4 grams (0.3 mol) of potassium carbonate and 12.0 grams (0.17 mol) of 2-ethylethylenimine (1,2-butylenimine). The mixture was stirred until the reactants dissolved and the solution was cooled to 12° C. A solution of 13.3 grams (0.05 mol) of trimesoyl chloride in 300 ml. of benzene was added dropwise with cooling and vigorous stirring over a period of 34 minutes. During this time the temperature of the mixture was maintained at 12–15° C. The reaction mixture was then allowed to warm to room temperature, while stirring, for an additional 1½ hours. The benzene layer was separated and evaporated at room temperature under vacuum to give 18.0 grams (a yield of 97.5 percent of theoretical) of viscous liquid N,N',N" - tris - 2 - ethylethylenetrimesamide (N,N',N" - tris - 1,2 - butylenetrimesamide). When subjected to analysis, the product was found to contain 11.90 weight percent nitrogen, 54.3 weight percent 2 - ethylazirane radical and 0.3 weight percent chlorine as compared with calculated values of 11.39 weight percent, 56.9 weight percent and 0.0 weight percent, respectively. The ring content corresponded to 95.5 percent of theoretical.

Example 10

To a reaction flask equipped with a stirrer, a thermometer, a condenser, and a dropping funnel were added 300 ml. of water, 41.4 grams (0.3 mol) of potassium carbonate and 12.0 grams (0.17 mol) of 2,2-dimethylethylenimine (isobutylenimine). The mixture was stirred until a solution was obtained and the solution was then cooled to 12° C. A solution of 13.3 grams (0.05 mol) of trimesoyl chloride in 300 ml. of benzene was added dropwise with cooling and vigorous stirring over a period of 32 minutes. During this time the temperature of the mixture was maintained at 12–15° C. The reaction mixture was then allowed to warm to room temperature, while stirring, for an additional 1½ hours. The benzene layer was separated and evaporated at room temperature under vacuum to give 17.5 grams of N,N',N''-tris-1,2-dimethylethylenetrimesamide (N,N',N'' - tris - 1,2 - isobutylenetrimesamide). This product was recrystallized from boiling n-heptane leaving a white crystalline solid melting at 84–85° C. When subjected to analysis, the product was found to contain 11.30 weight percent nitrogen and 0.3 weight percent chlorine as compared with calculated values of 11.39 weight percent and 0.0 weight percent, respectively. The ring content was at least 95 percent of theoretical.

Example 11

To a reaction flask equipped with a stirrer, a thermometer, a condenser, and a dropping funnel were added 300 ml. of water, 41.4 grams (0.3 mol) of potassium carbonate, 3.44 grams (0.08 mol) of ethylenimine and 4.56 grams (0.08 mol) of 2-methylethylenimine. The mixture was stirred until a solution was obtained and the solution was then cooled to 12° C. A solution of 13.3 grams (0.05 mol) of trimesoyl chloride in 300 ml. of benzene was added dropwise with cooling and vigorous stirring over a period of 34 minutes. During this time the temperature of the mixture was maintained at 12–15° C. The reaction mixture was then allowed to warm to room temperature, while stirring, for an additional 1½ hours. The benzene layer was separated and evaporated at room temperature under vacuum to give 13.7 grams of a white crystalline solid melting at 93–108° C. This product was found to contain 13.40 weight percent of nitrogen and 0.1 weight percent of chlorine as compared with calculated values of 13.72 weight percent and 0.0 weight percent, respectively (calculated values based on non-preferential reaction of trimesoylchloride with ethylenimine and 2-methylethylenimine). The product apparently contained N,N',N''-tris-ethylenetrimesamide and N,N',N''-tris-2-methylethylenetrimesamide as well as the mixed reaction products:

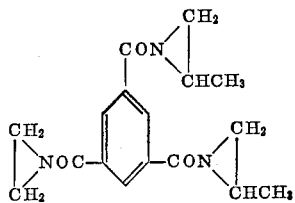

and:

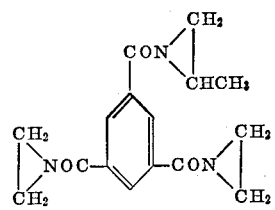

Although these products could be separated, if desired, the relatively low melting point of the mixture (M.P. 93–108° C.) rendered it more easily liquefied and polymerized, and the separation therefor would have served no practical purpose.

Example 12

The N,N'-bis-ethylenisophthalamide monomer produced in accordance with Example 2 was bulk polymerized to a clear, transparent, amorphous, insoluble, scratch-resistant resin by heating the monomer at about 120° C. for about 1 hour. The resulting polymer was found to have little or no softening or decomposition when heated to a temperature of above 120° C. This unusual property rendered this homopolymer especially suitable for use in high temperature adhesives as well as for protective coating and encapsulating applications in which the resin is subjected to high temperatures.

Example 13

The N,N' - bis - 1,2 - butylenisophthalamide monomer produced in accordance with Example 3 was polymerized by heating it to a temperature of about 120° C. for several hours to produce a clear, transparent, amorphous, pale-colored, solid homopolymer.

Example 14

About 25 parts by weight of N,N'-bis-ethylenisophthalamide, produced in accordance with Example 1, and about 100 parts by weight of Pliolite 8600 (a polyester resin having an available hydroxyl number of 400±10 produced by Reichold Chemicals Inc.) were mixed together and heated at 120° C. for about 3 hours. Gelation occurred in 30 minutes and after the full 3 hours of heating, a transparent, amorphous, tough, flexible elastic film of high impact strength was obtained. The general properties of this resulting copolymer rendered it especially suitable for use as an encapsulating resin and protective coating for wood, iron, copper and fabrics. This copolymer retained its flexibility at temperatures as low as −40° F.

Example 15

About 5 grams of N,N'-bis-ethylenisophthalamide monomer produced in accordance with Example 2 was placed in an aluminum foil dish and the dish placed in an oven at a temperature of 85° C. until the monomer melted. This required 5 to 10 minutes. A piece of copper wire was placed in the dish and the dish and its contents were maintained at a temperature of 85° C. for about 2½ hours, at 95° C. for an additional hour, at 120° C. for an additional hour, and then at 150° C. for a final hour. A colored, transparent casting containing the copper wire was obtained. Upon cooling, the resin did not crack or separate from the wire. This demonstrates the value of homopolymers in accordance with this invention as potting and casting preparation.

Example 16

Approximately 10 grams of a modified castor oil having a molecular weight of approximately 660 with approximately four hydroxyl groups per molecule, three being primary and one being secondary, were copolymerized with approximately 4 grams of N,N'-bis-ethylenisophthalamide in the presence of 0.5 percent of n-ethyl morpholine at 120° C. for one hour to produce a 25 mil flexible film. The film was transparent and amorphous and could be formed over a ⅛ inch mandrel with no cracking.

Example 17

The N,N',N''-tris-2-methylethylenetrimesamide monomer produced in accordance with Example 8 was bulk polymerized to a clear, transparent, tough, insoluble, amorphous and very hard resin by heating the monomer at about 120° C. for about five hours. This resin was formed into sheets which were capable of being drilled and machined and are useful, for example, as electrical insulation in radios and electrical household appliances. In addition, the polymer was formed into various shapes and used, for example, as electrical outlet and switch plates, in plastic buttons, in toys, in appliance housings and the like.

Example 18

The N,N'N''-tris-2-ethylethylenetrimesamide monomer produced in accordance with Example 9 was polymerized to a gel in 2½ hours by heating at 120° C. After a total polymerization time of 12 hours at 120° C. a clear, transparent, hard infusible and insoluble, solid, amorphous homopolymer was obtained having ultimate utility similar to that of the resin in preceding Example 17.

Example 19

About 3 grams of N,N',N'' - tris - 2 - methylethylenetrimesamide produced in accordance with Example 8 was melted at 120° C., 2 hours at 150° C. and 4 hours at 200° C. A hard, clear, transparent, heat stable, scratch-resistant, amorphous homopolymer which exhibits little or no shrinkage on polymerization was formed. The Modified Vicat Penetration Point of this resin is 180° C. This test was conducted as follows: The resin casting was submerged in an inert liquid. The flat bottom surface of a needle having a 1 ml. by 1 ml. cross section was pressed against the sample under a loading of 1 kg. and the liquid was heated at the rate of 2° C. per minute. The temperature at which the needle began to penetrate the sample was the value reported.

The value of this product as an encapsulating resin is apparent.

Example 20

About 5 parts of a trimethylenediamine promoter were added to a melt of 100 parts of N,N',N''-tris-2-methylethylenetrimesamide and the mixture was heated at 120° C. for 30 minutes at which time it was found to be gelled. After a further polymerization time of 1 hour at 120° C. and 45 minutes at 200° C., a hard, transparent, clear, amorphous resin was formed which had a Shore Hardness of E–58 (ASTM D 676–49T). This hardness is comparable to the hardest phenolic resins (considerably greater than conventional epoxy resin systems).

Example 21

About 8.63 grams of a carboxyl-terminated linear diethylene adipate polyester of molecular weight of about 2100 and 1.37 grams of N,N',N''-tris-2-methylethylenetrimesamide were mixed and heated for 2½ hours at 120° C. At the end of this polymerization time a transparent bubble-free amorphous rubber with the following physical properties had formed:

Tensile strength* _____ p.s.i__ 125
Elongation* _____ percent__ 300
Break set* _____ do____ 0

*Tensile, Elongation, Break Set—Dumbell specimens (0.5 inch and 0.125 inch between bench marks) 0.05 inch thick at jaw separation rate of 2 inches per minute. Test values correlated with those from ASTM D412–51T.

Example 22

About 100 parts of N,N',N''-tris-2,2-dimethylethylenetrimesamide monomer produced in accordance with Example 11 and 100 parts of hexamethylenediamine were stirred together at 120° C. until solution occurred. The solution was then maintained at 100° C. for 15 minutes at which time a gel was formed. After an additional polymerization time of 1¼ hours at 100° C. and 6 hours at 120° C. a transparent, flexible, amorphous copolymer film was formed. Little or no shrinkage was encountered during polymerization. The film could be formed over a ⅛ inch mandrel with no cracking.

Example 23

About 9.68 grams of a linear diethylene adipate polyester with an acid number (milligrams of potassium hydroxide per gram of sample) of 61, and 1.0 gram of N,N',N''-tris-ethylenetrimesamide prepared according to the procedure of Example 7, infra, were mixed togther at 120° C. After 2 hours at this temperature gelation occurred and the temperature of the mixture was raised to 150° C. After 2 hours at this temperature, a transparent, rubbery material formed which was suitable for use as a sealant (for example, in sealing aircraft fuel tanks). The physical properties of this rubbery material are as follows:

Tensile strength _____ p.s.i__ 80
Elongation _____ percent__ 500
Break set _____ do____ 0

Example 24

A sample of cotton cloth was immersed in a 6.3 weight percent solution of N,N',N'' - tris - 2 - methylethylenetrimesamide in benzene, air dried until the solvent was substantially removed and then polymerized for 30 minutes at 145° C. This treated cloth exhibits excellent water-proof properties when compared to an untreated sample of the same cloth.

Example 25

The following Table I demonstrates the storage and degradation characteristics of the polyamide products of this invention. The data shown is based on N,N'-bis-ethylenisophthalamide obtained in accordance with the teachings of this invention. The data is particularly illustrative since this aromatic polyamide is one of the most reactive of the polyamides. The table shows the relationship between the chlorine impurity content to the quantity of undecomposed or isomerized isophthalamide based on percent imine or azirane ring content of the product as compared with a theoretically pure product containing only the aromatic bis-isophthalamide. The percent ring content is equivalent to the amount of aromatic bis-isophthalamide in the product. Dry storage indicates product recovered from the solvent used in making the product. Solution storage indicates unseparated product of reaction from the solvent used, which in this case, was a 21 weight percent solution of solid aromatic bis-isophthalamide in benzene. Storage conditions were 25° and 5° C. for the separated or dry product and for the product in solution. All storage was in glass containers under air. Storage Sample D was an impure sample containing excess chlorine content and is for comparative purposes.

TABLE I
[Data expressed in percent of theoretical imine ring content]

| | Storage at 25° C. | | | | |
|---|---|---|---|---|---|
| | Dry Storage | | | | Solution Storage |
| Age, Days | A 0.4% Cl | B 0.3% Cl | C 0.5% Cl | D 4.5% Cl | A 0.4% Cl |
| 0 | 98.0 | 97.0 | 96.7 | 75 | 99.5 |
| 7 | | | | | 98.0 |
| 18 | 92.8 | 89.7 | 86.4 | | |
| 21 | | | | 69 | 97.2 |
| 28 | 88.7 | 89.1 | 80.2 | <50 | |
| 31 | | | | | 97.0 |
| 45 | 86.1 | 89.0 | 80.5 | | |
| 49 | | | | | 95.4 |
| 60 | 85.4 | 88.5 | 81.5 | | |
| 63 | | | | | 95.2 |
| 74 | 84.3 | 90.0 | 81.5 | | |
| 76 | | | | | 93.9 |
| 88 | 83.8 | 86.1 | 80.0 | | |
| 91 | | | | | 91.9 |

TABLE I—Continued

Storage at 5° C.

| Age, Days | Dry Storage | | | Solution Storage |
|---|---|---|---|---|
| | A 0.4% Cl | B 0.3% Cl | C 0.5% Cl | A 0.4% Cl |
| 0 | 98.0 | 97.0 | 96.7 | 99.5 |
| 7 | | | | 99.5 |
| 18 | 96.1 | 96.7 | 94.9 | |
| 21 | | | | 98.0 |
| 28 | 96.6 | 96.5 | 95.6 | |
| 31 | | | | 97.5 |
| 45 | 96.5 | 95.1 | 93.9 | |
| 49 | | | | 97.0 |
| 60 | 95.5 | 95.6 | 93.3 | |
| 63 | | | | 98.7 |
| 74 | 96.1 | 95.1 | 93.1 | |
| 76 | | | | 98.5 |
| 88 | 95.6 | 94.1 | 92.3 | |
| 91 | | | | 97.0 |

The storage properties of the polyamides for proper purity should show at least 85 percent ring content in 18 days at 25° C. and at least about 95 percent ring content in 18 days at 5° C. Samples showing less than 80 percent ring content at any time under any conditions are unsatisfactory and of improper purity. Solutions of the polyamides maintain their ring content over prolonged periods and are the best manner of storing and handling the materials. The concentration of the polyamides in the solution vary with the solvent and the particular polyamide, but usually is at least about 15 weight percent and as high as 50 to 60 weight percent. The content as produced is about 20 to 25 weight percent and can be increased by distillation or evaporation of some of the solvent to above this value, such as 30 weight percent and higher.

The procedure for determining the imine ring content is as follows:

Weight out sample containing 1 meq. of imino (1 equivalent corresponds to 1 ethylenimino group), add to approximately 50 ml. of a neutralized (usually 2 drops 0.1 N base) 0.2 mol solution of $Na_2S_2O_3$ in 50 percent acetone containing phenolphthaline, and the mixture is heated in a flask (3-neck iodine flask) carrying a reflux condenser and a rubber stopper holding a 10 ml. burette. As the solution is heated, the pink color which develops is continuously discharged by adding 0.2 N acetic acid from the burette. When no further alkalinity is produced, generally after 15–20 minutes, the solution is cooled and any excess of acetic acid is titrated with 0.1 N NaOH.

This procedure is for water-insoluble imino compounds.

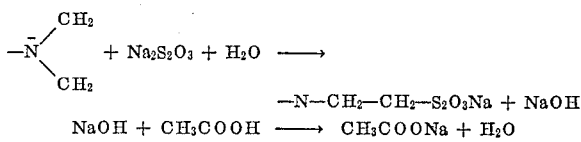

$$-N-CH_2-CH_2-S_2O_3Na + NaOH$$
$$NaOH + CH_3COOH \longrightarrow CH_3COONa + H_2O$$

Calculations are based on the following formula:

$$\frac{TV(Vol.\ CH_3COOH - Back\ Titration) \times N \times Equiv.\ wt. \times 100}{1000 \times sample\ wt.} = Percent\ imino\ cpd.$$

References to method are Journal of Chemical Society, 1950, p. 2257; and for water-soluble compounds, see Anal. Chem., vol. 27, April, 1955, p. 540.

Various modifications and alterations in the reaction conditions may become apparent to those skilled in the art without departing from the scope of this invention. Also, numerous compounds other than those specifically disclosed can obviously be made in accordance with this invention in view of the teachings herein contained.

The following is claimed:

1. A composition of matter comprising a stable N,N'-bis(N-1,2-alkylene) isophthalamide having at least 85 percent of the theoretical azirane ring content and having the formula

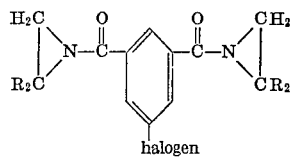
halogen

2. A liquid composition of matter comprising N,N'-bis-1,2-propylenisophthalamide having at least 85 percent of the theoretical azirane ring content.

3. A liquid composition of matter comprising N,N'-bis-1,2-butylenisophthalamide having at least 85 percent of the theoretical azirane ring content.

4. A solid composition of matter comprising N,N'-bis-ethylenechloroisophthalamide in stable form having at least 85 percent of the theoretical azirane ring content.

5. A solid composition of matter comprising N,N'-bis-1,2-propylenechloroisophthalamide having at least 85 percent of the theoretical azirane ring content.

References Cited

UNITED STATES PATENTS 3,115,474  12/1963  Smith.
2,950,197  8/1960  Allen et al.

FOREIGN PATENTS 740,723  5/1943  Germany.

OTHER REFERENCES

Bestian: Liebigs Ann. der Chem., vol. 566, pp. 211–213 and 229.

Hendry et al.: Brit. J. Pharm. Chem., vol. 6, pp. 359 and 370–371 (1951).

Stock et al.: Cancer Research, vol. 15, supplement No. 2, p. 308 (1955).

ALTON D. ROLLINS, *Primary Examiner.*